Jan. 10, 1967 R. J. McCARTHY 3,297,933
BATTERY DISPENSER-CHARGER DEVICES
Filed Dec. 30, 1963 2 Sheets-Sheet 1

INVENTOR.
ROBERT J. McCARTHY
BY
OSTROLENK, FABER, GERB & SOFFEN
ATTORNEYS

Jan. 10, 1967 R. J. McCARTHY 3,297,933
BATTERY DISPENSER-CHARGER DEVICES
Filed Dec. 30, 1963 2 Sheets-Sheet 2
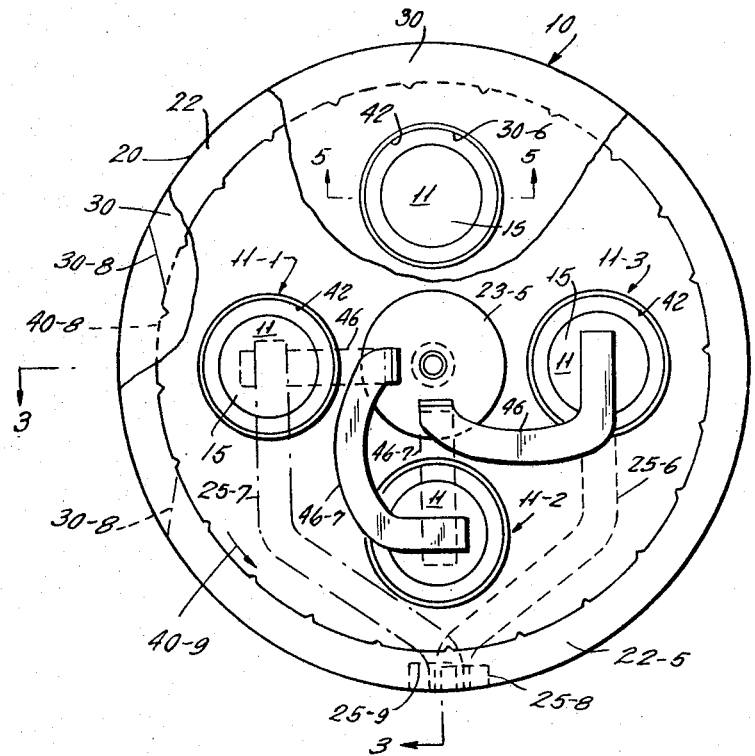
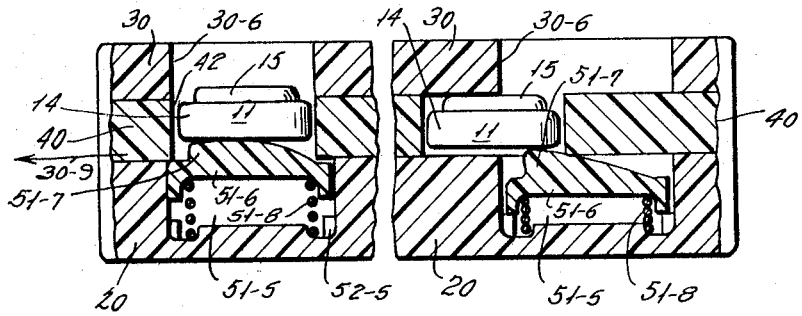
INVENTOR.
ROBERT J. McCARTHY
BY
OSTROLENK, FABER, GERB & SOFFEN
ATTORNEYS United States Patent Office 3,297,933
Patented Jan. 10, 1967

3,297,933
BATTERY DISPENSER-CHARGER DEVICES
Robert J. McCarthy, Goldens Bridge, N.Y., assignor to Sonotone Corporation, Elmsford, N.Y.
Filed Dec. 30, 1963, Ser. No. 334,162
9 Claims. (Cl. 320—2)

This invention relates to a battery dispenser and charger device. There are many applications, for instance, hearing aids, which operate with an extremely small battery cell which has to be replaced by the user after a few hours' use. To meet this problem the hearing aid user is provided with battery dispenser containing several replacement cells so that after exhausting one cell he can replace it with another cell. Most of such hearing aids operate with what is known as dry or non-rechargeable cells, with the exhausted cell being discarded and replaced by a fresh cell.

The present invention involves a dispenser for supplying the user with similar small rechargeable battery cells, so that after the used rechargeable cell has been exhausted it may be replaced by fully-charged cell from the dispenser, with the exhausted cell being returned to the dispenser for recharging.

In accordance with the invention, such battery dispenser-charger has a cell holder or housing for holding a plurality of at least two rechargeable battery cells arrayed in predetermined cell sequence and connected in series relation between two opposite polarity charging terminals of the dispenser so that the dispenser may be readily placed in and connected to a recharging device for recharging its serially connected cells. The cell holder or housing has wall opening means arranged so as to permit removal or withdrawal of the cell which has been held and recharged for the longest period in the cell recharging dispenser and the insertion of the exhausted cell in the dispenser behind the sequence of previously inserted cells so that it is automatically connected as the last cell for recharging it in series with the previously returned cells. Furthermore, the so last-returned cell is so held in the dispenser as to permit removal thereof only after removal of all cells which have been previously returned to the dispenser and subjected to more recharging than the last returned cell.

The foregoing and other objects of the invention will best be understood by the following description of exemplifications thereof, reference being had to the accompanying drawings wherein, FIG. 1 is a diagrammatic view of the battery cell dispenser-charger of the invention and of its associated charging circuit device;

FIG. 4 is a top view of the dispenser-charger unit of FIGS. 1 to 4 as seen in FIG. 1 with portions of one side wall removed to expose its underlying interior;

FIG. 5 is a cross-sectional view of a portion of same dispenser unit along lines 5—5 of FIG. 4; and FIG. 6 is a cross-sectional view similar to FIG. 5 with a return cell partially advanced toward its first recharging position in the dispenser of FIGS. 1 to 4.

In accordance with the invention, a battery cell dispenser-charger has cell advancing means operative to advance in one direction only a sequence of at least two rechargeable cells to sequence of successive charging positions with all cells in all of said sequence positions being held serially connected between dispenser charging terminals for charging all cells held in sequence in each such charging position. In addition, the dispenser requires only one passage opening through which the recharged cell that was the first inserted into its cell sequence may be removed from the dispenser and through which an exhausted cell may be inserted therein as the last cell of the cell sequence.

Figure 1:
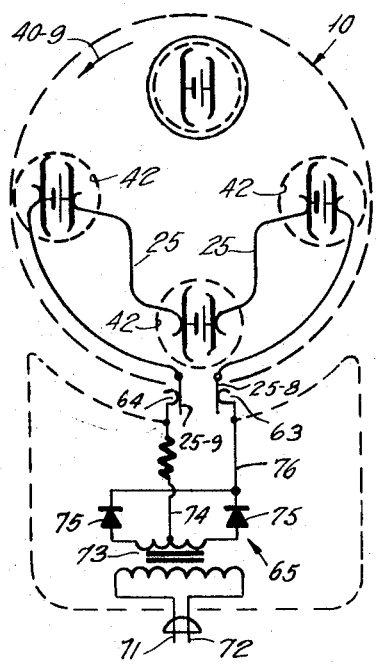
Figure 2:
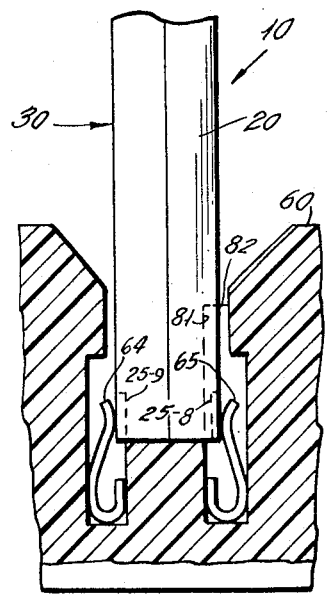
FIG. 2 is a side elevation of a dispenser-charger unit as it is held in its charging device.

FIG. 1 shows diagrammatically, FIGS. 2-6 show structurally, one example of dispenser-charger device based on the just described principles of the invention. It comprises a dispenser 10 shown as a flat structure of small height or thickness, as indicated in FIG. 2. The dispenser 10 has two side walls 20 and 30 shown bounded by flat outer wall surface which may, however, be of other shape. In exterior wall portions of dispenser 10 are held affixed two external exposed charging terminals, 25, 25 arranged so that when the dispenser 10 is inserted into discharging compartment space 61-5 of charger 60 (FIG. 2) the two dispenser charging terminals 25-8, 25-9 will automatically establish contact engagement with charging circuit terminals 63, 64 of charging circuit means 65, forming part of the charger 40 (FIG. 4).

Dispenser 10 has two dispenser side walls 20, 30 defining between them a cell space within which are held in predetermined charging sequence a plurality of rechargeable battery cells 11. Each rechargeable battery cell 11 comprises at least one negative electrode plate 12 and one opposite-polarity positive electrode plate 13, held separated by porous insulating separator (not shown) holding therein electrolyte for providing electro-chemical reactions between the two electrodes when discharging or charging the cell 11. As in conventional similar other sealed battery cells, the assembly of electrodes 12, 13 with their separators and electrolyte are enclosed in a metallic casing showing comprising a tubular or cup shaped metallic casing 14, the upper end of which is enclosed by metallic casing cover 15.

As in the conventional similar sealed cells, the upper open edge region of tubular or cylindrical casing 14 is joined to the surrounding circular rim of metallic casing cover 15 across an insulating collar by a tight junction seal, for instance, clamping or crimping the edge of casing 14 over the rim of the metallic casing cover 15 and its overlapping insulating collar. Such insulating junction seals are described, for example, in U.S. Patent No. 3,081,366, issued March 12, 1963, and require no further explanation.

The cell space of dispenser 10 is provided with cell advancing means or member 40 movably positioned between the side walls 20, 30 of the dispenser 10. In the form shown, cell advancing member 40 has a central bearing rotatably seated on a shaft projection 23 of side wall 20, although it may be formed by a similar projection of the other side wall 30 or by shaft joining the two side walls 20, 30. Suitable means, a rivet 29, for example, are provided for holding two side walls 20, 30, affixed to each other so as to hold therebetween for rotatable advancing motion the cell advancing member 40. Although it may have a larger number of cell holding spaces, depending on the particular use, the dispenser 10 shown has a cell advancing member 40 provided with four cell holding positions or spaces 42 for holding a sequence of three cells 11 in serially connected charging positions with the fourth similar cell space 42 used for removing the cell which was first placed in its charging cell sequence, or adding an exhausted cell as the last cell of the sequence of cells to be charged. In the specific example of dispenser shown, the cell holding spaces 40-5 are designed to hold the rechargeable cells 11 in flatwise positions. However, the dispenser shown can be readily modified so that the individual cells may be held therein in a 90° turned position with the flat cell casing bottom wall extending perpendicularly to the facing inner wall surface 22 of said wall 20.

One of the dispenser side walls 20, 30, for example, side wall 30, is provided with a passage opening 30-6 through which the first of the sequence of three cells 11 held in three charging positions of the dispenser 10-5 is removed from the charging sequence. The same wall passage opening 30-6 also serves to insert an exhausted cell 11 into the dispenser 10 as the last of the sequence of three cells 11 held in the three charging positions of the dispenser. In the form shown, dispenser side wall 30, seen in the plan view of FIG. 1, is provided with the cell passage opening 30-6 exposing therein the upper casing wall 15 of the battery cell 11 as it is held in the underlying cell space 42 of the cell advancing member 40, and also as seen in the dispenser cross-section of FIG. 5. The major part of the dispenser as seen in FIG. 4 extending to the right of the cell passage opening 30 shows the major part of the cell advancing member 40 holding in three of its cell spaces 42 three battery cells 11 with the positive cell casing terminal 15 facing upwardly (FIG. 4) and the oppositely facing flat bottom wall of each cell casing resting on the interior surface 22 of the casing side wall 20.

The dispenser housing 10 formed by its side walls 20, 30 is also provided with electric conductor members for automatically connecting all three cells 11 held by advancing member 40 in the three charging positions in series connection between two charging terminals 25-8 and 25-9 of dispenser 10.

As an example, two opposite-polarity metallic charging terminals 25-8, 25-9 may be affixed on two opposite exposed wall portions on the periphery of the two side walls members 20, 30 of dispenser housing 10. The two charging terminals 25-8, 25-9 are so arranged that when the dispenser 10 is inserted into a charging space 61 of a charger 60 (FIG. 5) they will automatically connect with the charging terminals 63, 64 of the charging circuit 65 thereof, as seen in FIG. 1.

The dispenser 10 has also metallic connectors 25 for connecting all cells 11 held in its several charging positions in series relation between the charging terminals 25-8, 25-9 thereof, as the cells 11 are advanced step-by-step to the successive charging positions by the step-wise motion of cell advancing member 40. The example of dispenser shown has only three charging positions. In FIG. 4, the three charging positions to which each cell 11 is successively advanced are indicated by three arrows, 11-1, 11-2 and 11-3. The series connectors 25 for serially connecting the sequence of cells 11 which are advanced to the dispenser charging positions, 11-1, 11-2, 11-3, may be formed by printed circuit portions or a combination of printed and solid conductor portions or by independent solid conductors.

Figure 3:
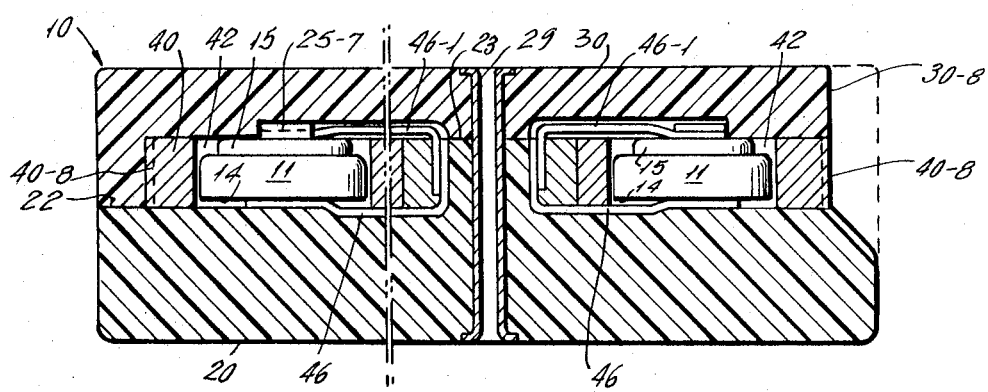
FIG. 3 is cross-sectional view along two 90° inclined radial-plane lines 3—3 of FIG. 4.

FIGS. 3 and 4 show the dispenser 10 provided with spring conductors of Phosphor-bronze sheet metal, for example, for serially connecting the three cells 11 held in or advanced to the three charging positions 11-1, 11-2, 11-3 between the dispenser charging terminals 25-8, 25-9. One spring conductor 46 connects the positive terminal 15 of the cell in charging position 11-1 to the opposite polarity cell bottom terminal of the cell casing 14 held in charging position 11-2. The other spring connector 46 similarly connects the positive casing terminal 15 of the cell held in charging position 11-2 to the negative bottom casing terminal 14 of the cell held in charging position 11-3. Each spring connector 46 has a bottom arm (as seen in FIGS. 3 and 4) engaging the bottom casing terminal 14 of one cell and a curved upper end arm 46-7 engaging the positive casing end terminal 15 of the next cell. Each series connector 46 is indicated as formed of two connector sections having their respective ends bent into anchor elements metallically engaging each other and held affixed or anchored in a slit of central side wall projection 23 (FIG. 3). To complete the series connections of the sequence of cells 11 held in the several charged positions to the charging circuit, the bottom casing terminal 14 of the cell in position 11-3 is connected through a conductor 25-6 of the housing wall structure to the exposed dispenser charging terminal 25-8. The opposite dispenser charging terminal 25-9 is connected through a similar conductor 25-7 to the positive terminal 15 of the cell held in charging position 11-1. In each of the different charging positions 11-1, 11-2, 11-3 of the dispenser the end portions of the two connector conductors 46-5 which engage opposite polarity metallic walls of two successive charged cells 11 are provided with conventionl biasing means to assure positive contact engagement with the respective cell casing terminal walls. As an example, contacting ends of the connector conductors 46-5 may be of spring metal biased into pressure contact engagement with adjacent metallic casing wall of the cell 11 thus causing the opposite cell terminal wall to engage with a corresponding pressure contact in engagement with its associated flat connector end.

The dispenser of the invention, exemplified in FIGS. 1 to 6 is provided with means for assuring that the individual cells 11 of the cell sequence thereof are advanced to successive charging positions, such as charging positions 11-1, 11-2, 11-3, in one direction only.

As seen in FIGS. 3 and 4, one of the dispenser side walls has a recessed border portion 30-8 for exposing a peripheral portion 40 of cell advancing member 40-5 so that it may be gripped as by the hand of the user for advancing step-wise within the dispenser housing.

In the example of the dispenser shown in FIGS. 1 to 6, cell advancing member is arranged to advance its sequence of cells 11 to the successive charging positions 11-1, 11-2, 11-3, etc., by counterclockwise motion as indicated by arrow 40-9 (FIG. 4). With such cell advancing arrangement, the cell occupying cell position 11-3 has reached it after having been advanced by cell advancing means 40-5 past charging positions 11-1 and 11-2, in each of which the cell has been subjected to recharging.

Assuming that the rechargeable cell 1 of the user's appliance, such as a hearing aid, has become exhausted and he desires to replace it with a recharged battery cell 11 from the dispenser 10-5, in such case he inserts the exhausted cell 11 through the dispenser wall passage 30-6 into the underlying cell space 42-5 of cell advancing member 40-5, as seen at dispenser passage opening 36-6 in FIG. 5. He thereupon grips exposed rim portion 40-8 of advancing member 40 and advances it one step, which brings the exhausted cell previously inserted through wall passage 30-6 to first charging position 11-1 of dispenser. In this advancing step, cell advancing member 40 also brings the recharged cell 11 from the last dispenser charging position 11-3 to wall passage opening 30-6 from which the user removes it and inserts it as a replacement in his appliance. In other words, the user turns exposed rim 40-8 of the cell advancing member 40-5 exposed along a recessed side wall portion 30-8 (FIGS. 3, 4) until the cell which occupied charging position 11-3 has been brought, by counterclockwise motion, to cell passage opening 30-6 of dispenser wall 30-5 as the counterclockwise movement of the cell advancing member 35 brings the exhausted cell—previously placed through wall passage 30-6 into cell advancing member 40-5—to the first charging position 11-1.

The dispenser of the invention is also provided with means for assuring that cell advancing member 40-5 can be advanced in only one direction, and only by successive steps from one charging position to the next charging position within the dispenser.

FIGS. 5 and 6 show one arrangement of means for assuring that cell advancing member 40-5 may be advanced in the dispenser in one direction only to bring each cell held therein to successive charging positions and also assuring that such advancing motion shall be performed step by step to bring an exhausted cell 11 from the wall passage position 30–6 to the first charging position 11–1, as the previously inserted cells 11 are advanced to the next charging positions 11–2, 11–3, and the recharged cell from position 11–3 is returned to the wall passage 30–6 from which the user removes it as replacement for the exhausted cell 11.

FIG. 5 being a cross-section of the dispenser 10 along lines 5—5 of FIG. 4 shows a portion of side wall 30 having the opening passage 30–6 through which an exhausted cell 11 is placed in the underlying cell space 42 of the cell advancing member 40. The underlying portion of the opposite dispenser wall 20 has a compartment or recess 51–5 holding therein a ratchet wall portion 51–6 with a ratchet projection 51–7 biased by suitable bias means in upward direction as seen in FIG. 5 into the cell space 42 of cell advancing member 40.

Any suitable biasing means may be used for biasing ratchet wall portion 51–6 in upward direction as seen in FIG. 5. As an example, ratchet wall 51–6 may be formed of a synthetic resin material, as are all the other wall members 20, 30, 40 of the dispenser 10. The connection of the thinner portion of the ratchet wall 51–6 to adjacent wall body 20 is made flexible and of such thickness so that the elastic restoring forces thereof maintain the thicker part of ratchet wall body 51–6 biased in upward direction so that its ratchet projection 51–7 is held within the cell space 40–5 of cell advancing member 40. For simplifying the description of ratchet wall, member 51 is shown biased for upward movement by a compressed helical coil spring 51–8. Upward movement of the ratchet wall 51–6 may be limited, for instance, by forming it with lateral projections wider than the width of the overlying cell space 42 of advancing member 40. With such ratchet wall arrangement cell advancing member 40 may be advanced within the housing only in the counterclockwise arrow direction to the left, as indicated by arrow 30–9 (FIG. 4). The ratchet projection 51–7 prevents opposite clockwise motion of cell advancing member 40 within the dispenser 10.

The outwardly biased ratchet wall 51–6 may be readily proportioned and designed so as to automatically eject a fully charged cell 11 advanced from dispenser charging position 11–3 to dispenser wall passage 30–6 position. Such an arrangement assures that a fully charged cell 11 will be automatically lifted from its position within the cell advancing member 40–5 into the wall passage opening 30–6. By providing the ejector wall portion 51–6 with the required selected biasing means 51–8 such recharged cell, when brought opposite to dispenser wall passage 30–6, such cell will be automatically ejected from its position within the dispenser.

It is also extremely simple to bring into the first charging position 11–1 an exhausted cell after inserting it through wall passage 30–6 into underlying cell advancing space 42–5. To this end the user places the exhausted cell through the wall passage 30–6 into the underlying cell space of advancing member 40 (FIGS. 4 and 5). Thereupon the so positioned cell 11 is pushed inwardly against the ejector wall 51–6 until the latter is stopped by engagement with one or more wall stops 52–5 in compartment 51–5 of dispenser wall 20–5. With the cell 11 now aligned in height with the surrounding body of the cell advancing member 40, the exposed rim 40–8 of cell advancing member 40 is gripped and advanced until the ratchet wall 51–6 reaches the next cell space 42–5 of cell advancing member 40, whereupon it immediately enters this cell advancing member space 42–5 and retains it in this position.

Any known type of charging circuit may be used in the charger 60 for charging the serially connected cells 11 of dispenser 10. FIG. 1 shows diagrammatically one form of such charging circuit 65. It comprises supply leads 71 extending from plug 72 adapted to be plugged into a domestic power supply circuit, for instance, of 110 volts. A step-down transformer 73 has primary windings connected to the power supply leads 71, and secondary windings with a midtap connected through conductor 74 to charging terminal 64 of charger unit 60. The two ends of the secondary transformer windings are connected through two rectifiers 75 and charging leads 76 to the other charging terminal 63 of charger 60. Charging lead 74 has shown connected therein a resistance proportioned to assure that the proper level of charging current is supplied to the serially connected cells 11 held in dispenser 10.

Polarizing means are also provided to assure that dispenser 10 can be inserted into charging space 61 of charger in only one polarized position wherein the charging circuit 65 supplies the cells 11 of dispenser 10 direct current in proper charging direction. As an example, the exterior side of dispenser sidewall 20 is provided with a longitudinal polarizing channel 81 shaped to complement and make sliding engagement with longitudinal charger polarizing projection 82 when dispenser 10 is inserted for recharging into charger 60 in properly oriented position. With such and other analogous arrangements dispenser 10 can be inserted into the charger 60 in only the properly oriented position so that the direct charging current will flow through dispenser cells 11 in charging direction only.

The principles underlying the invention described in connection with specific exemplifications will suggest other modifications thereof. It is accordingly desired that the appended claims shall not be limited to specific features shown or described herein.

The embodiments of the invention in which an exclusive privilege or property is claimed are defined as follows.

I claim:

1. In a battery dispenser-charger device:
a holder having a substantially enclosed housing,
said housing of a size to be conveniently carried on the person of the user,
and hand held during the removal or insertion of batteries,
said housing having two extended opposite side walls defining between them an extended dispenser space with sequence of at least three peripherally displaced internal cell locations for locating therein a sequence of at least three rechargeable cells,
advancing means for advancing a sequence of at least three cells in one generally annular direction along said cell location sequence,
the sequence of cell locations defined by said walls including a sequence of at least two combined storage and charging locations, comprising a first location for a first battery cell and a last location for last battery cell advanced by said advancing member,
said holder having a pair of battery cell terminals at each of said charging locations, and internal connector means for serially connecting said battery cell terminals to charging terminals external of said housing,
said connector means including connector elements connecting one polarity terminal of a cell held in said first charging location to an opposite polarity terminal of the next cell of said sequence and also for connecting a similar opposite polarity terminal of a cell held in said last charging location to a similar one polarity terminal of a cell held in a preceding location of said charging location sequence for serially connecting the battery cells held in said charging locations to said external charging terminals,
said external charging terminals adapted to permit connection of said holder, with its internally located and stored battery cells, as a self-contained integral unit, to an external charging circuit, said holder having peripheral opening means adjacent to a cell space of said advancing member for first removing therefrom the charged cell advanced thereto from said last charging location and for then replacing therein a discharged cell to be advanced to said first charging location.

2. A battery dispenser-charger device as set forth in claim 1, wherein:

said peripheral opening means being a single passage for first removing the cell from said last location and then receiving a cell to be progressed to said first location.

3. In a battery dispenser-charger device as claimed in claim 1, and ratchet means associated with said holder and said advancing means for confining motion of said advancing means to one direction only.

4. In a battery dispenser-charger as claimed in claim 3 and said ratchet means including a ratchet element held by one of said side walls and biased to enter a cell space and stop the motion of said advancing member in response to advancing a cell from one to the next of said cell locations.

5. In a battery dispenser-charger as claimed in claim 3, said ratchet means having a ratchet portion shaped to engage portions of said advancing member for confining the motion of said advancing member to said one direction only.

6. A battery dispenser-charger device, as set forth in claim 1 wherein:

said advancing means being a disc-like member having a plurality of battery cell receiving pockets, corresponding in number and peripheral spacing with said cell locations of the housing side walls, means mounting said disc-like member for rotatable movement intermediate said side walls, and ratchet means for inhibiting the rotation of said disc-like member when the pockets thereof are in registry relationship with the cell locations.

7. In a battery dispenser-charger device as claimed in claim 6, and a ratchet member movably held by one of said side walls biased to move from a retracted position into a pocket of and stop the motion of said advancing member in response to advancing a cell from one to the next of said location sequences, the other of said sidewalls having said opening means, said ratchet member being held near said opening means for entering a cell space of said advancing member aligned with said opening means.

8. In a battery dispenser-charger device as claimed in claim 6, and a ratchet member movably held by one of said side walls biased to move from a retracted position into a pocket of and stop the motion of said advancing member in response to advancing a cell from one to the next of said location sequences, the other said sidewalls having said opening means, said ratchet member being held near said opening means for entering a cell space of said advancing member aligned with said opening means, the portion of said ratchet member entering said advancing member pocket being shaped to engage it for preventing motion of said advancing member in a direction reverse to said one direction.

9. In a battery dispenser-charger device as claimed in claim 6, and a ratchet member movably held by one of said side walls biased to move from a retracted position into a pocket of and stop the motion of said advancing member in response to advancing a cell from one to the next of said location sequences, the other of said sidewalls having said opening means, said ratchet member being held near said opening means for entering a cell space of said advancing member aligned with said opening means, the portion of said ratchet member entering said advancing member pocket being shaped to engage it for preventing motion of said advancing member in a direction reverse to said one direction, and to return said ratchet member to its retracted position by advancing said advancing member in said one direction to advance a cell to the next cell location.

References Cited by the Examiner

UNITED STATES PATENTS

| 1,832,948 | 11/1931 | Schmidt | 324—29.5 X |
| 3,093,270 | 6/1963 | Sarmento et al. | 222—360 |
| 3,116,451 | 12/1963 | Hatterschide | 324—29.5 |
| 3,143,697 | 8/1964 | Springer | 320—2 |
| 3,180,521 | 4/1965 | Di Domenico | 324—29.5 X |

FOREIGN PATENTS 203,873  10/1956  Australia.

JOHN F. COUCH, *Primary Examiner.*

S. WEINBERG, *Assistant Examiner.*